US012380536B2

(12) United States Patent
Parra et al.

(10) Patent No.: US 12,380,536 B2
(45) Date of Patent: Aug. 5, 2025

(54) IMAGE-BASED MATCHING OF COLOR AND APPEARANCE OF COATINGS CONTAINING EFFECT PIGMENTS, USING A COSINE COMPARISON METHODOLOGY

(71) Applicant: AXALTA COATING SYSTEMS IP CO., LLC, Wilmington, DE (US)

(72) Inventors: Sebastian Hurtado Parra, Philadelphia, PA (US); Neil R. Murphy, Audubon, NJ (US); Francisco Miguel Martinez Verdú, Upper Darby, PA (US); Anthony Calabria, Thornton, PA (US); Larry Steenhoek, Ellicott City, MD (US); Benjamin Gamoke, Collingswood, NJ (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 400 days.

(21) Appl. No.: 18/163,070

(22) Filed: Feb. 1, 2023

(65) Prior Publication Data

US 2024/0255352 A1    Aug. 1, 2024

(51) Int. Cl.
*G06T 7/44* (2017.01)
*G01J 3/46* (2006.01)
*G06T 5/40* (2006.01)

(52) U.S. Cl.
CPC ............... *G06T 5/40* (2013.01); *G01J 3/462* (2013.01); *G01J 3/463* (2013.01); *G06T 7/44* (2017.01)

(58) Field of Classification Search
CPC .... G06V 10/758; G06V 10/44; G06V 10/467; G06V 10/50; G06V 10/54; G06V 10/56;
(Continued)

(56) References Cited

U.S. PATENT DOCUMENTS 6,564,202 B1 *  5/2003  Schuetze ................. G06F 16/30
6,567,797 B1 *  5/2003  Schuetze ................. G06F 16/30
                                                707/999.005
(Continued)

FOREIGN PATENT DOCUMENTS

EP          3500830 A1      6/2019
EP          3937136 A1      1/2022
(Continued)

OTHER PUBLICATIONS

Saravanan et al., "Real Time Implementation of RGB to HSV/HSI/HSL and Its Reverse Color Space Models", IEEE, International Conference on Communication and Signal Processing, Apr. 6-8, 2016, India (Year: 2016).*
(Continued)

*Primary Examiner* — Aaron W Carter
(74) *Attorney, Agent, or Firm* — Ingrassia Fisher & Lorenz, LLP

(57) ABSTRACT

Disclosed here is a method of matching color and appearance of coatings containing at least one effect pigment. The method involves: obtaining, for a coating sample, sample color image data having pixel-specific color model properties; generating a characterizing histogram for the sample color image data, wherein the characterizing histogram represents an appearance feature descriptor of the coating sample; creating a sample histogram vector from the characterizing histogram; retrieving a specimen histogram vector for a candidate coating specimen; and calculating a cosine similarity value from the sample histogram vector and the specimen histogram vector, wherein the cosine similarity value indicates how well the candidate coating specimen matches the coating sample to be matched.

22 Claims, 8 Drawing Sheets

(58) Field of Classification Search
CPC .. G06V 10/761; G06V 10/764; G06T 7/0004; G06T 7/90; G06T 2207/10024; G06T 2207/30156; G06T 7/40; G06F 18/24133; G06F 16/5838; G06F 16/5862; G06F 18/23213; G06F 18/24147; G06F 18/22; G01J 2003/466; G01J 3/462; G01J 3/463
See application file for complete search history.

(56) References Cited

U.S. PATENT DOCUMENTS

| | | | | |
|---|---|---|---|---|
| 6,598,054 | B2* | 7/2003 | Schuetze | G06F 16/904 |
| | | | | 345/650 |
| 6,708,167 | B2* | 3/2004 | Lee | G06F 16/5838 |
| 6,728,752 | B1* | 4/2004 | Chen | G06F 16/34 |
| | | | | 707/E17.058 |
| 6,941,321 | B2* | 9/2005 | Schuetze | G06F 16/355 |
| 7,679,756 | B2 | 3/2010 | Sperling et al. | |
| 8,065,314 | B2 | 11/2011 | Prakash et al. | |
| 8,582,802 | B2† | 11/2013 | Clippard et al. | |
| 8,909,574 | B2 | 12/2014 | Mohammadi et al. | |
| 9,064,149 | B1* | 6/2015 | Dhua | G06V 10/56 |
| 9,607,403 | B2 | 3/2017 | Beymore et al. | |
| 9,880,098 | B2 | 1/2018 | Prakash et al. | |
| 10,613,727 | B2 | 4/2020 | Beymore et al. | |
| 10,950,008 | B2 | 3/2021 | Beymore et al. | |
| 11,062,479 | B2 | 7/2021 | Steenhoek et al. | |
| 11,361,418 | B2* | 6/2022 | Yuan | G06V 10/764 |
| 2002/0106122 | A1* | 8/2002 | Messing | G06T 7/90 |
| | | | | 382/162 |
| 2004/0091135 | A1* | 5/2004 | Bourg, Jr. | G01N 21/8851 |
| | | | | 382/110 |
| 2004/0197012 | A1* | 10/2004 | Bourg, Jr. | G06F 18/2132 |
| | | | | 382/110 |
| 2005/0033523 | A1* | 2/2005 | Abe | G06V 20/40 |
| | | | | 702/20 |
| 2005/0084154 | A1* | 4/2005 | Li | G06V 10/56 |
| | | | | 348/231.2 |
| 2006/0033922 | A1 | 2/2006 | Sperling et al. | |
| 2007/0091184 | A1* | 4/2007 | Wang | H04N 23/88 |
| | | | | 348/223.1 |
| 2008/0069427 | A1* | 3/2008 | Liu | G06V 10/26 |
| | | | | 382/137 |
| 2009/0019086 | A1 | 1/2009 | Prakash et al. | |
| 2009/0324077 | A1* | 12/2009 | Wu | H04N 21/44236 |
| | | | | 382/218 |
| 2011/0150344 | A1* | 6/2011 | Lee | G06V 10/44 |
| | | | | 382/203 |
| 2013/0163870 | A1* | 6/2013 | Cao | G06V 10/36 |
| | | | | 382/170 |
| 2013/0251252 | A1* | 9/2013 | Wang | G06V 10/56 |
| | | | | 382/165 |
| 2014/0023280 | A1* | 1/2014 | Lin | G06F 16/5862 |
| | | | | 382/218 |
| 2014/0193071 | A1* | 7/2014 | Cho | G06V 10/50 |
| | | | | 382/170 |
| 2014/0204238 | A1* | 7/2014 | Cao | H04N 21/4728 |
| | | | | 348/222.1 |
| 2014/0294300 | A1* | 10/2014 | Swaminathan | G06V 10/758 |
| | | | | 382/170 |
| 2015/0286892 | A1* | 10/2015 | Ohno | G06F 16/583 |
| | | | | 382/170 |
| 2016/0005187 | A1* | 1/2016 | Prakash | G01N 21/4738 |
| | | | | 356/402 |
| 2016/0132720 | A1* | 5/2016 | Klare | G06V 40/171 |
| | | | | 382/118 |
| 2016/0142700 | A1* | 5/2016 | Grover | H04N 13/243 |
| | | | | 348/47 |
| 2016/0189003 | A1* | 6/2016 | Liu | G06F 16/5838 |
| | | | | 382/165 |
| 2017/0200288 | A1* | 7/2017 | Beymore | G06T 7/90 |
| 2017/0372128 | A1* | 12/2017 | Owen | G06V 10/50 |
| 2018/0122065 | A1* | 5/2018 | Abedini | G06T 7/0016 |
| 2019/0096073 | A1* | 3/2019 | Nishimura | G06T 1/20 |
| 2021/0073891 | A1* | 3/2021 | Al Jadda | G06Q 30/0631 |
| 2021/0201513 | A1* | 7/2021 | Steenhoek | G01J 3/0272 |
| 2021/0239531 | A1 | 8/2021 | Steenhoek et al. | |
| 2021/0248418 | A1* | 8/2021 | Guo | G06T 7/194 |
| 2022/0107222 | A1* | 4/2022 | Bischoff | G01N 21/25 |
| 2022/0304617 | A1* | 9/2022 | Kim | A61B 1/00009 |
| 2022/0381615 | A1† | 12/2022 | Bischoff | |
| 2023/0145070 | A1† | 5/2023 | Baughman et al. | |
| 2023/0191823 | A1* | 6/2023 | Hsu | B42D 25/30 |
| | | | | 382/103 |
| 2023/0221182 | A1* | 7/2023 | Baughman | G01J 3/463 |
| | | | | 356/402 |
| 2023/0237738 | A1* | 7/2023 | Rump | G06V 10/141 |
| | | | | 345/419 |
| 2023/0343051 | A1* | 10/2023 | Rump | G06F 3/011 |
| 2024/0135588 | A1* | 4/2024 | Krawciw | G06V 10/761 |
| 2024/0203145 | A1* | 6/2024 | Hsu | G06V 30/19013 |
| 2024/0203150 | A1* | 6/2024 | Hsu | G06V 30/148 |
| 2024/0255352 | A1* | 8/2024 | Parra | G06T 7/44 |
| 2024/0257493 | A1* | 8/2024 | Parra | G06F 18/22 |
| 2024/0310213 | A1* | 9/2024 | Verdú | G01J 3/504 |

FOREIGN PATENT DOCUMENTS

| | | | |
|---|---|---|---|
| WO | WO-2019113605 A1† | 6/2019 | |
| WO | 2020200982 A1 | 10/2020 | |
| WO | 2021013615 A1 | 3/2021 | |
| WO | 2021055745 A1 | 3/2021 | |

OTHER PUBLICATIONS

Author Unknown, "HCL color space", Wikipedia, revision dated Jan. 29, 2023 (Year: 2023).*

Ojala T. et al. "A comparative study of texture measures with classification based on feature distributions" dated Jan. 1, 1996, vol. 29 No. 1.

Matti Pietikainen "Two decades of local binary patterns: A survey in Advances in Independent Component Analysis and Learning Machines" dated Apr. 15, 2015, pp. 175-210.

ASTM E 284-17, "Standard Terminology of Appearance", ASTM International, West Conshohocken, PA. 2017.

Dauser T. "Definition of Tolerances and Evaluation of the Difference in the Sparkling and Graininess of Effect Paints" Volkswagen (2010), pp. 1-6, vol. VW50194, No. 2010-09.

Ferrero A., et al. "An insight into the present capabilities of national metrology institutes for measuring sparkle", Metrologia, (Nov. 2020) pp. 2-19, vol. 57, IOP Publishing.

Ferrero A et al. "Preliminary measurement scales for sparkle and graininess" Research Article, (Mar. 2021) pp. 1-12. vol. 29.

Kirchner Eric et al. "Visibility of Sparkle in Metallic Paints", Research Article, (Nov. 2014) pp. 1-7, vol. 32.

Kitaguchi S. "Modeling Texture Appearance of Gonioapparent Objects" University of Leeds PHD thesis, (Mar. 2008) pp. 3-274.

Wei Ting Shou et al. "A Comprehensive Model of Colour Appearance for Related and Unrelated Colours of Varying Size Viewed Under Mesopic to Photopic Conditions" Color Research Application, (Feb. 2014) pp. 293-304, vol. 42.

Yang Jie et al. "Predicting visual similarity between colour palettes", Research Article, (Jul. 2019) pp. 1-8, vol. 22492.

Zhongning H., et al. "Camera-based model to predict the total difference between effect coatings under directional illumination". Chinese Optics Letters, (Sep. 2011) pp. 1-5, vol. 9.

Nguyen Hieu V. et al. "Cosine Similarity Metric Learning for Face Verification" dated Nov. 8, 2010, pp. 1 709-720.

"Color Histogram", Wikipedia, The Free Encyclopedia., webpage http://en.wikipedia.org/wiki/Color_histogram, archived Mar. 31, 2022, web.archive.org/web/20220331222310/http://en.wikipedia.org/wiki/Color_histogram.†

Nathan Moroney, Ingeborg Tastl, Melanie Gottwals, "A Similarity Measure for Large Color Differences" in Proc. IS&T 22nd Color and Imaging Conf., 2014, pp. 234-239, pub. Nov. 2014, DOI 10.2352/CIC.2014.22.1.art00041.†

(56) References Cited

OTHER PUBLICATIONS

"Cosine Similarity", Wikipedia, website https://en.wikipedia.org/wiki/Cosine_similarity, archived Mar. 3, 2022, https://web.archive.org/web/20220303173637/https:/en.wikipedia.org/wiki/Cosine_smilarity.†

\* cited by examiner
† cited by third party

IMAGE-BASED MATCHING OF COLOR AND APPEARANCE OF COATINGS CONTAINING EFFECT PIGMENTS, USING A COSINE COMPARISON METHODOLOGY

TECHNICAL FIELD

Embodiments of the subject matter described herein relate generally to coatings technology. More particularly, embodiments of the subject matter relate to systems and methods for matching color and appearance of a sample coating to one or more known coating specimens.

BACKGROUND

Visualization and selection of coatings having a desired color and appearance play an important role in many applications. For example, paint suppliers must provide thousands of coatings to cover the range of global OEM manufacturers' coatings for all current and recent model vehicles. Providing this large number of different coatings as factory package products adds complexity to paint manufacture and increases inventory costs. Consequently, paint suppliers provide a mixing machine system including typically 50 to 100 components (e.g., single pigment tints, binders, solvents, additives) with coating formulas for the components that match the range of coatings of vehicles. The mixing machine may reside at a repair facility (i.e., body shop) or a paint distributor. The system allows a user to obtain a coating having the desired color and appearance by dispensing the components in amounts corresponding to a particular coating formula. The coating formulas are typically maintained in a database and are distributed to customers via computer software by download or direct connection to internet databases. Each of the coating formulas typically relate to one or more alternate coating formulas to account for variations in coatings due to variations in vehicle production.

Identification of the coating formula most similar to a target coating sample is complicated by this variation. For example, a particular coating might appear on three vehicle models, produced in two assembly plants with various application equipment, using paint from two OEM paint suppliers, and over a lifetime of five model years. Effect coatings further complicate coating matching due to spatially nonuniform color variation in visual texture or appearance. These sources of variation result in significant coating variation over the population of vehicles with that particular coating. The alternate coating formulas provided by the paint supplier are matched to subsets of the color population so that a close match (based on a combination of color and visual texture matches at different measurement geometries) is available for any vehicle that needs repair.

Identifying the coating formula most similar to a target coating sample for a repair is typically accomplished through either the use a spectrophotometer or a fan deck. Spectrophotometers and image capture systems measure one or more color and appearance attributes of the target coating to be repaired. This color and appearance data is then compared with the corresponding data from potential candidate formulas contained in a database. The candidate formula whose color and appearance attributes best match those of the target coating to be repaired is then selected as the coating formula most similar to the target coating.

Alternatively, fan decks include a plurality of sample coating layers on pages or patches within the fan deck. Each of the alternate coating formulas can be represented by a color chip in the fan deck, which enables the user to select the best matching formula by visual comparison to the vehicle (the sample coating layers of the fan deck are visually compared to the target coating sample to be matched). The formula associated with the sample coating layer best matching the color and appearance attributes of the target coating to be matched is then selected as the coating formula most similar to the target coating sample. However, fan decks are cumbersome to use and difficult to maintain due to the vast number of sample coating layers necessary to account for all coatings on vehicles on the road today.

As such, it is desirable to provide a system and a method for matching color and appearance of coatings containing at least one effect pigment. In addition, other desirable features and characteristics will become apparent from the subsequent summary and detailed description, and the appended claims, taken in conjunction with the accompanying drawings and this background.

BRIEF SUMMARY

Disclosed here is a method of matching color and appearance of coatings containing at least one effect pigment. Certain embodiments of the method involve: obtaining, for a coating sample to be matched, sample color image data including pixel-specific color model properties, wherein the sample color image data is based on a digital image of the coating sample to be matched, as captured by a digital image capture system; generating a characterizing histogram for the sample color image data, the characterizing histogram including N distinct bins to obtain N bin counts, wherein the characterizing histogram represents an appearance feature descriptor of the coating sample to be matched; creating a sample histogram vector from the characterizing histogram, wherein the sample histogram vector is an N-dimensional vector including the N bin counts; retrieving a specimen histogram vector for comparison against the sample histogram vector, wherein the specimen histogram vector is an N-dimensional vector derived from pixel specific color model properties obtained for a candidate coating specimen in response to a captured digital image of the candidate coating specimen; and calculating a cosine similarity value from the sample histogram vector and the specimen histogram vector as a measure of an angle between the sample histogram vector and the specimen histogram vector, wherein the cosine similarity value indicates how well the candidate coating specimen matches the coating sample to be matched.

Also disclosed is at least one non-transitory machine-readable storage medium that stores instructions executable by at least one processor. The instructions are configurable to cause the at least one processor to perform a method of matching color and appearance of coatings containing at least one effect pigment. Certain embodiments of the method involve: obtaining, for a coating sample to be matched, sample color image data including pixel specific color model properties, wherein the sample color image data is based on a digital image of the coating sample to be matched, as captured by a digital image capture system; generating a characterizing histogram for the sample color image data, the characterizing histogram including N distinct bins to obtain N bin counts, wherein the characterizing histogram represents an appearance feature descriptor of the coating sample to be matched; creating a sample histogram vector from the characterizing histogram, wherein the sample histogram vector is an N-dimensional vector including the N bin counts; retrieving a specimen histogram vector for comparison against the sample histogram vector, wherein the specimen histogram vector is an N-dimensional vector derived from pixel specific color model properties obtained for a candidate coating specimen in response to a captured digital image of the candidate coating specimen; and calculating a cosine similarity value from the sample histogram vector and the specimen histogram vector as a measure of an angle between the sample histogram vector and the specimen histogram vector, wherein the cosine similarity value indicates how well the candidate coating specimen matches the coating sample to be matched.

Also disclosed is a computing system operable to match color and appearance of coatings containing at least one effect pigment. Certain embodiments of the computing system include: at least one processor; and at least one non-transitory machine-readable storage medium that stores instructions executable by the at least one processor. The instructions are configurable to cause the at least one processor to perform a method that includes the steps of: obtaining, for a coating sample to be matched, sample color image data including pixel specific color model properties, wherein the sample color image data is based on a digital image of the coating sample to be matched, as captured by a digital image capture system; generating a characterizing histogram for the sample color image data, the characterizing histogram including N distinct bins to obtain N bin counts, wherein the characterizing histogram represents an appearance feature descriptor of the coating sample to be matched; creating a sample histogram vector from the characterizing histogram, wherein the sample histogram vector is an N-dimensional vector including the N bin counts; retrieving a specimen histogram vector for comparison against the sample histogram vector, wherein the specimen histogram vector is an N-dimensional vector derived from pixel specific color model properties obtained for a candidate coating specimen in response to a captured digital image of the candidate coating specimen; and calculating a cosine similarity value from the sample histogram vector and the specimen histogram vector as a measure of an angle between the sample histogram vector and the specimen histogram vector, wherein the cosine similarity value indicates how well the candidate coating specimen matches the coating sample to be matched.

Also disclosed is a method of matching color and appearance of coatings containing at least one effect pigment. Certain embodiments of the method involve: obtaining, for a coating sample to be matched, sample color image data including pixel-specific hue values, wherein the sample color image data is based on a digital image of the coating sample to be matched, as captured by a digital image capture system; generating a hue histogram for the pixel-specific hue values, wherein the hue histogram arranges the pixel-specific hue values into N distinct hue value bins to obtain N bin counts, and wherein the hue histogram represents an appearance feature descriptor of the coating sample to be matched; creating a sample histogram vector from the hue histogram, wherein the sample histogram vector is an N-dimensional vector including the N bin counts; retrieving a specimen histogram vector for comparison against the sample histogram vector, wherein the specimen histogram vector is an N-dimensional vector derived from pixel specific hue values obtained for a candidate coating specimen in response to a captured digital image of the candidate coating specimen; and calculating a cosine similarity value from the sample histogram vector and the specimen histogram vector as a measure of an angle between the sample histogram vector and the specimen histogram vector, wherein the cosine similarity value indicates how well the candidate coating specimen matches the coating sample to be matched.

Also disclosed is a method of matching color and appearance of coatings containing at least one effect pigment. Certain embodiments of the method involve: obtaining, for a coating sample to be matched, sample color image data having pixel specific color model properties, wherein the sample color image data is based on a digital image of the coating sample to be matched, as captured by a digital image capture system; creating local binary patterns based on the pixel-specific color model properties; generating a binary pattern histogram for the local binary patterns, wherein the binary pattern histogram arranges the local binary patterns into N distinct bins to obtain N bin counts, and wherein the binary pattern histogram represents an appearance feature descriptor of the coating sample to be matched; and utilizing the binary pattern histogram for comparison against a previously generated binary pattern histogram that serves as an appearance feature descriptor of a candidate coating specimen.

Also disclosed is at least one non-transitory machine-readable storage medium that stores instructions executable by at least one processor. The instructions are configurable to cause the at least one processor to perform a method of matching color and appearance of coatings containing at least one effect pigment. Certain embodiments of the method involve the steps of: obtaining, for a coating sample to be matched, sample color image data having pixel-specific color model properties, wherein the sample color image data is based on a digital image of the coating sample to be matched, as captured by a digital image capture system; creating local binary patterns based on the pixel-specific color model properties; generating a binary pattern histogram for the local binary patterns, wherein the binary pattern histogram arranges the local binary patterns into N distinct bins to obtain N bin counts, and wherein the binary pattern histogram represents an appearance feature descriptor of the coating sample to be matched; and utilizing the binary pattern histogram for comparison against a previously generated binary pattern histogram that serves as an appearance feature descriptor of a candidate coating specimen.

Also disclosed is a computing system operable to match color and appearance of coatings containing at least one effect pigment. Certain embodiments of the computing system include: at least one processor; and at least one non-transitory machine-readable storage medium that stores instructions executable by the at least one processor. The instructions are configurable to cause the at least one processor to perform a method that includes the steps of: obtaining, for a coating that contains at least one effect pigment, color image data having pixel specific color model properties, wherein the color image data is based on a digital image of the coating, as captured by a digital image capture system; creating local binary patterns based on the pixel-specific color model properties; generating a binary pattern histogram for the local binary patterns, wherein the binary pattern histogram arranges the local binary patterns into N distinct bins to obtain N bin counts, and wherein the binary pattern histogram represents an appearance feature descriptor of the coating; and creating a coating histogram vector based on the binary pattern histogram, wherein the coating histogram vector is an N-dimensional vector including the N bin counts, wherein the coating histogram vector is usable for comparing color and appearance of the coating against color and appearance of at least one other coating.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
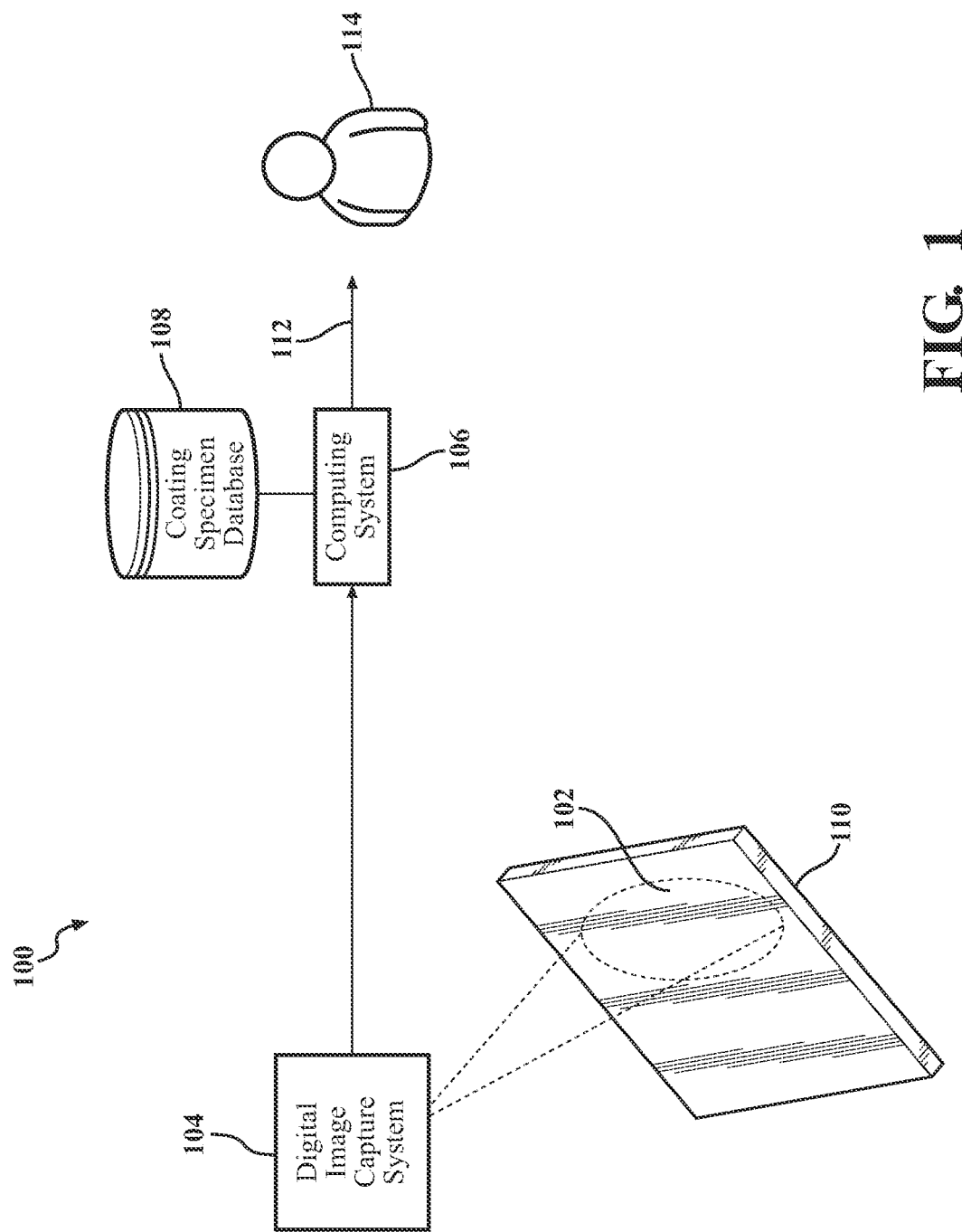
FIG. 1 is a simplified block diagram representation of a system for matching color and appearance of coatings, in accordance with exemplary embodiments of the invention.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software, or the like, various elements of the systems and devices described herein are essentially the code segments or instructions that cause one or more processor devices to perform the various tasks. In certain embodiments, the program or code segments are stored in at least one tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

As used herein, the term "pigment" or "pigments" refers to a colorant or colorants that produce color or colors. A pigment can be from natural or synthetic sources and can be made of organic and/or inorganic constituents. Pigments can also include metallic particles or flakes with specific or mixed shapes and dimensions. A pigment is usually not soluble in a coating composition.

The term "effect pigment" or "effect pigments" refers to pigments that produce special spatially nonuniform effects in a coating, i.e., goniochromatism and visual texture (sparkle and graininess). Examples of effect pigments include, but are not limited to, light scattering pigments, light interference pigments, and light reflecting pigments. Metallic flakes, such as aluminum flakes, and pearlescent pigments, such as mica-based pigments, are examples of effect pigments.

The term "appearance" can include: (1) the aspect of visual experience by which a coating is viewed or recognized; and (2) perception in which the spectral and geometric aspects of a coating is integrated with its illuminating and viewing environment. In general, appearance includes texture, coarseness or graininess, sparkle, or other visual effects of a coating, especially when viewed from varying viewing angles and/or with varying illumination conditions. Appearance characteristics or appearance data can include, but not limited to, descriptions or measurement data on texture, metallic effect, pearlescent effect, gloss, distinctness of image, flake appearances and sizes such as texture, coarseness or graininess, sparkle, glint and glitter as well as the enhancement of depth perception in the coatings imparted by the flakes, especially produced by metallic flakes, such as aluminum flakes. Appearance characteristics can be obtained by visual inspection or by using an appearance measurement device.

The term "color data" or "color characteristics" or "color model properties" of a coating can comprise measured color data including, without limitation: spectral reflectance values; X,Y,Z values; L*, a*, b* values; L*, C*, $h_{ab}$ values; or a combination thereof. Color data can further comprise a color code of a vehicle, a color name or description, or a combination thereof. Color data may also comprise visual aspects of color of the coating, chroma, hue, lightness or darkness. Color data can be obtained by visual inspection, or by using a color measurement device such as a colorimeter, a spectrophotometer, or a goniospectrophotometer. In particular, spectrophotometers obtain color data by determining the wavelength spectrum of light reflected by a coating layer. Color data can also comprise: descriptive data, such as a name of a color, a color code of a vehicle; a binary, textural or encrypted data file containing descriptive data for one or more colors; a measurement data file, such as those generated by a color measuring device; or an export/import data file generated by a computing device or a color measuring device. Color data can also be generated by an appearance measuring device or a color-appearance dual measuring device.

The term "coating" or "coating composition" can include any coating compositions known to those skilled in the art and can include a two-pack coating composition, also known as "2K coating composition"; a one-pack or 1K coating composition; a coating composition having a cross-linkable component and a crosslinking component; a radiation curable coating composition, such as a UV curable coating composition or an e-beam curable coating composition; a mono-cure coating composition; a dual-cure coating composition; a lacquer coating composition; a waterborne coating composition or aqueous coating composition; a solvent borne coating composition; or any other coating compositions known to those skilled in the art. The coating composition can be formulated as a primer, a basecoat, a midcoat, a clearcoat, or a color coat composition by incorporating desired pigments or effect pigments. The coating composition can also include a clearcoat composition.

The term "formula," "matching formula," or "matching formulation" for a coating composition refers to a collection of information or instruction, based upon that, the coating composition can be prepared. In one example, a matching formula includes a list of names and quantities of pigments, effect pigments, and other components of a coating composition. In another example, a matching formula includes instructions on how to mix multiple components of a coating composition.

FIG. 1 is a simplified block diagram representation of an embodiment of a system 100 for matching color and appearance of coatings, e.g., coatings containing at least one effect pigment. For the illustrated embodiment, the system 100 is utilized to find at least one candidate coating specimen (assuming that one is available) that best matches the color and appearance of a coating sample 102 to be matched. The depicted simplified embodiment of the system 100 includes, without limitation: at least one digital image capture system 104; at least one computing system 106; and at least one coating specimen database 108. For simplicity, one digital image capture system 104, one computing system 106, and one coating specimen database 108 are shown and described. It should be understood that an implementation of the system 100 may include more than one of these elements, as appropriate for the particular embodiment. The elements of the system 100 communicate (via physical and/or wireless communication links) with one another as needed to support the described functionality of the system 100.

The coating sample 102 may reside on a substrate 110. The substrate 110 may be a vehicle, a component of a vehicle, a surface of a vehicle, or the like. The substrate 110 may also be any coated article that includes or carries the coating sample 102. For this particular example, the coating sample 102 is a colored coating that contains at least one effect pigment to provide a color sparkle appearance. The coating sample 102 is formed in accordance with a particular production formulation that specifies the amount and type of constituent components used to fabricate the coating sample 102.

The digital image capture system 104 includes one or more digital cameras that can be operated to capture at least one digital image of the coating sample 102. The dashed lines in FIG. 1 represent the field of view of a captured digital image of the coating sample 102. Digital images captured by the digital image capture system 104 are processed by the computing system 106. In some embodiments, the digital image capture system 104 is separate and distinct from the computing system 106. In other embodiments, the digital image capture system 104 and the computing system 106 are combined and implemented together in a single piece of hardware. The system 100 includes or cooperates with the coating specimen database 108, which contains data corresponding to a number of coating specimens. As explained in more detail below, the coating specimen database 108 can be maintained to store color image data, color model properties data, histogram information derived from color image data, appearance data, and/or other characterizing data for any number of previously analyzed and characterized coating specimens. The coating specimen database 108 may be associated with the digital image capture system 104, associated with the computing system 106, and/or associated with a system or platform that is separate and distinct from the digital image capture system 104 and the computing system 106, such as in a server-based or in a cloud computing environment.

The computing system 106 executes at least one matching algorithm to compare color sparkle characteristics of the coating sample 102 against corresponding color sparkle characteristics of previously characterized coating specimens, with a goal of identifying candidate coating specimens that best match the color and appearance of the coating sample 102. To this end, the computing system 106 may be suitably configured to generate and output an appropriate output 112 that identifies the best matching candidate coating specimens for purposes of production and application (e.g., for repair or repainting of a vehicle body). The output 112 may be rendered on a display element, printed in a readable format, generated as audio content, or otherwise presented to a user 114 of the system 100.

Figure 2:
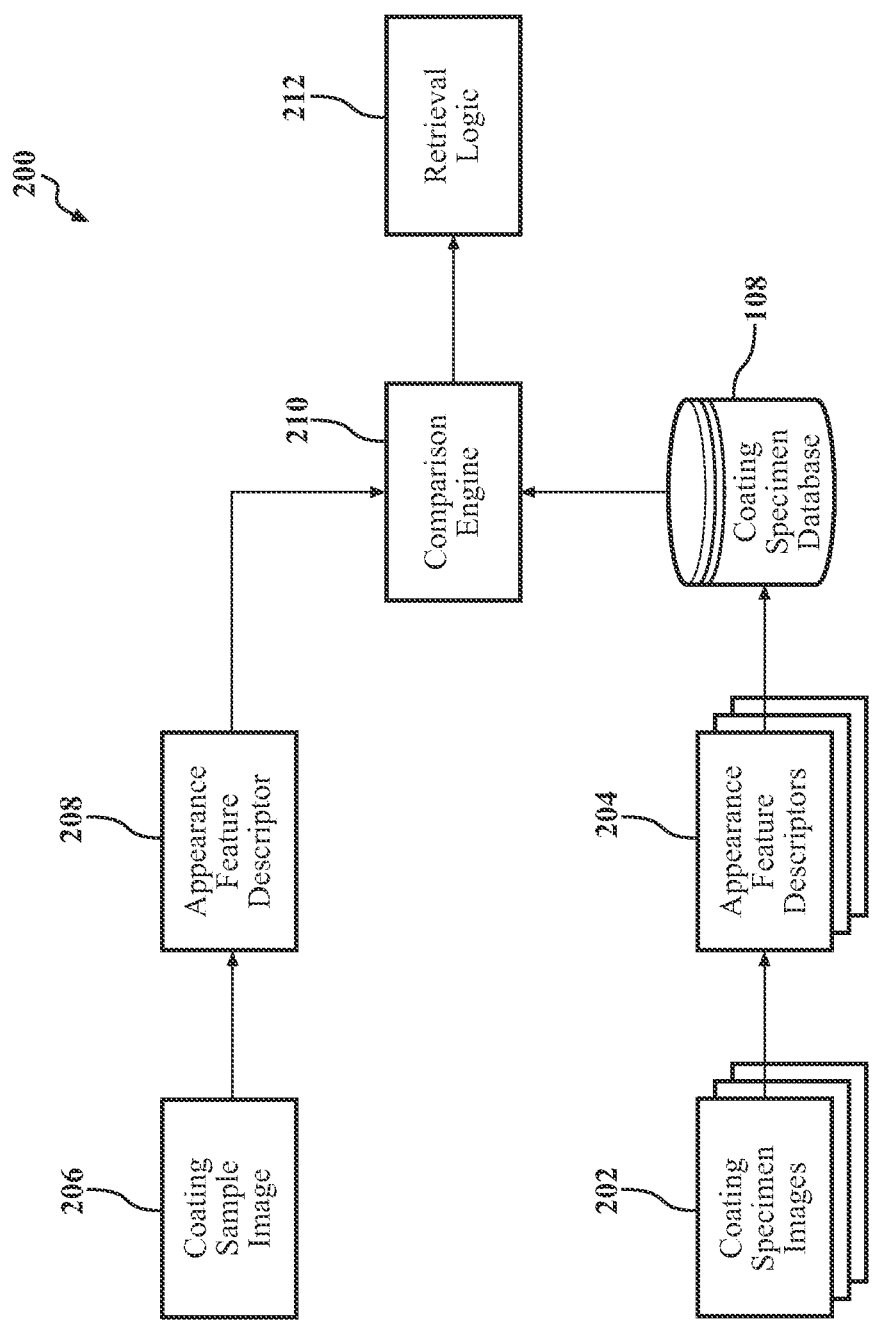
FIG. 2 is a simplified block and data flow diagram that illustrates a methodology for matching color and appearance of coatings, in accordance with exemplary embodiments of the invention.

FIG. 2 is a simplified block and data flow diagram that illustrates a methodology 200 for matching color and appearance of coatings, in accordance with exemplary embodiments. This description assumes that at least one coating specimen database 108 (as described with reference to FIG. 1) has already been populated with the relevant data associated with a number of coating specimens. To this end, coating specimen images 202 are captured, processed, and analyzed in an appropriate manner to obtain corresponding appearance feature descriptors 204 that characterize the color and appearance of different coating specimens. The appearance feature descriptors 204, the coating specimen images 202, and other characterizing or identifying data are maintained in the coating specimen database 108 to allow the methodology 200 to compare previously characterized coating specimens against coating samples (which need not be previously characterized).

A coating sample image 206 is captured for a coating sample to be matched. The captured coating sample image 206 is processed and analyzed to obtain a corresponding feature descriptor 208 that characterizes the color and appearance of that particular coating sample. Notably, the processing and analysis performed on the coating sample image 206 is consistent with the processing and analysis performed on the different coating specimen images 202, and the appearance feature descriptor 208 characterizes, defines, or describes the coating sample in the same manner as the appearance feature descriptors 204 for the coating specimens. This allows the methodology 200 to compare the coating sample against one or more of the previously characterized coating specimens. In certain embodiments, at least some aspects of the appearance feature descriptor 208 (obtained for the coating sample image 206) can be compared against at least some aspects of the appearance feature descriptors 204 (obtained for the coating specimen images 202). The methodology 200 may employ any suitable comparison metric, algorithm, or logic as appropriate for the particular embodiment and application. FIG. 2 depicts this comparison functionality as being implemented or executed by a comparison engine 210.

The results of the comparison can be used by appropriate retrieval logic 212 to retrieve information corresponding to one or more matching coating specimens. For example, the retrieval logic 212 can retrieve (from, e.g., the coating specimen database 108 and/or from another database) any of the following, without limitation: an identifier of a candidate coating specimen; descriptive data for a candidate coating specimen; color or appearance data for a candidate coating specimen; a production formulation associated with manufacturing or mixing of a candidate coating specimen. In this regard, a production formulation for a well-matched coating specimen can be used to mix a coating composition that will be applied to the target surface of interest, e.g., a surface of a vehicle.

Figure 3:
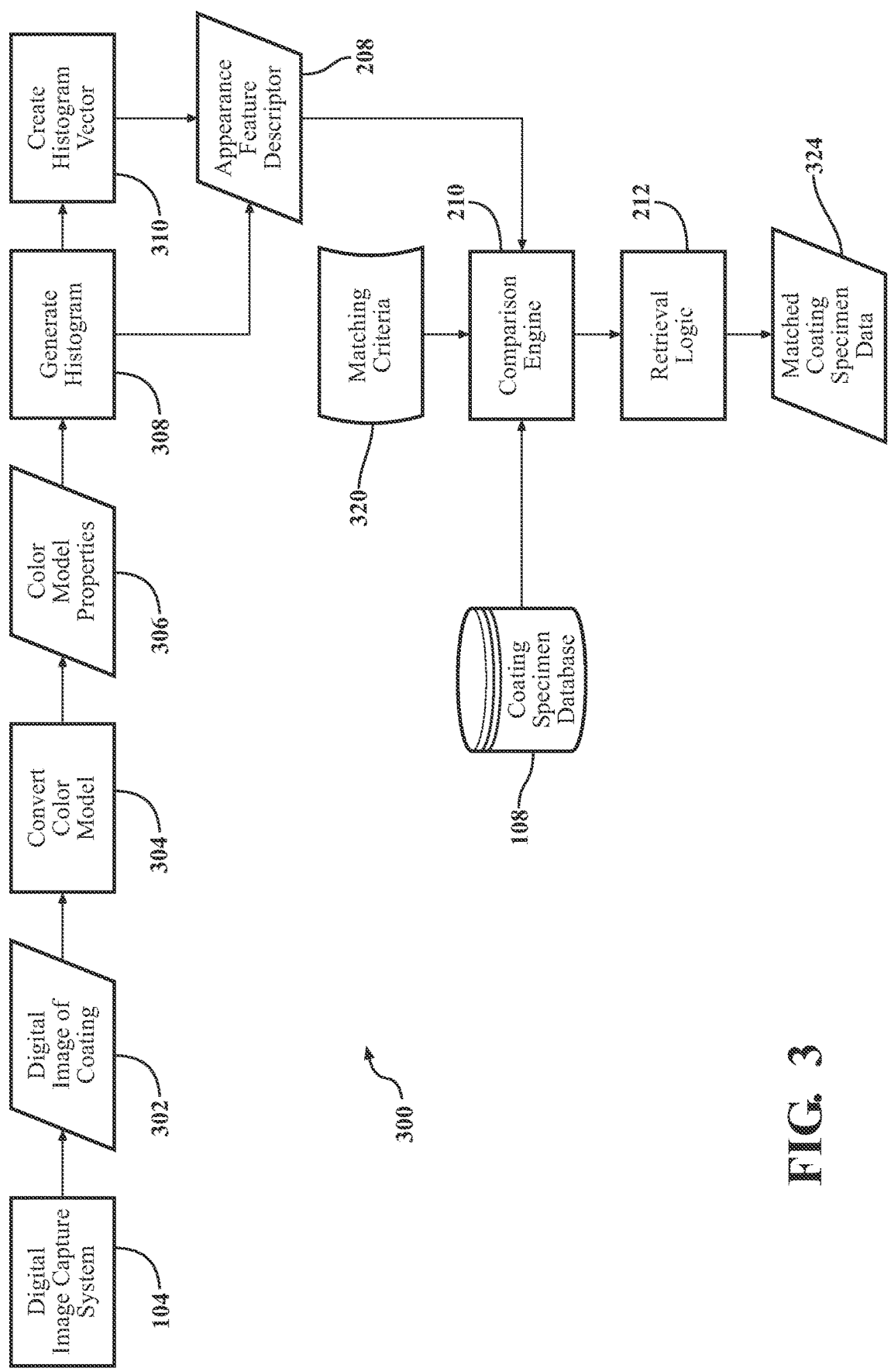
FIG. 3 is a more detailed block and data flow diagram that illustrates a methodology for matching color and appearance of coatings, in accordance with exemplary embodiments of the invention.

FIG. 3 is a block and data flow diagram that illustrates a methodology 300 for matching color and appearance of coatings, in accordance with exemplary embodiments. The methodology 300 is consistent with operation of the system 100 described above with reference to FIG. 1, and is also consistent with the methodology 200 described above with reference to FIG. 2. In this regard, the methodology 300 can be utilized with an exemplary implementation of the system 100 if so desired. Accordingly, FIG. 3 depicts the at least one digital image capture system 104, the at least one coating specimen database 108, the appearance feature descriptor 208 (which is associated with a coating sample to be matched), the comparison engine 210, and the retrieval logic 212 as previously described. Although the at least one computing system 106 of FIG. 1 is not depicted in FIG. 3, it should be understood that the methodology 300 can be carried out with one or more suitably configured and programmed computing systems.

The illustrated embodiment of the methodology 300 uses the digital image capture system 104 to capture at least one digital image 302 of a coating sample to be matched. The digital image capture system 104 may be a device that can capture images under a wide range of electromagnetic wavelengths including visible or invisible wavelengths. The digital image capture system 104 may be realized as any of the following, without limitation: set of one or more devoted digital cameras (still or video); a mobile device that includes digital camera functionality (e.g., a mobile phone, a portable computer such as a tablet computer or a laptop computer, a wearable device such as a smart watch or smart glasses); a specialized piece of equipment that is particularly configured to capture digital images of coatings; or any other type of device known in the art that is configured and operated to capture digital images.

For the example presented here, the digital image 302 of the coating sample is represented by captured color image data that is formatted in accordance with a first (original) color model, e.g., the raw or native format of the digital image capture system 104. In certain non-limiting embodiments, the first color model is an RGB color model that utilizes RGB values for the captured color image data. The illustrated methodology 300 performs a color model conversion task 304 to convert the captured color image data into sample color image data, wherein the sample color image data is formatted in accordance with a second color model that is different than the first color model. The second color model utilizes defined color model properties 306 for the sample color image data. For example, the second color model may be an L*a*b* color model that uses L*a*b* values for its color model properties, with or without accounting for scene, photometric, or spectroradiometric information. As another example, the second color model may be an L*C*h color model that uses L*C*h values for its color model properties. As yet another example, the second color model may be any suitable model that includes hue information as a color model property. In accordance with certain embodiments, the methodology 300 converts the original or raw RGB values (from the captured digital image 302 of the coating sample) to obtain color model properties 306 that are expressed as L*C*h values.

In this description, the "sample color image data" includes the converted color model properties or values. The sample color image data includes pixel-specific information that defines the color characteristics of the captured image. In this regard, each pixel can be associated with one or more color model properties that are defined and dictated by the second color model. For instance, when the L*C*h color model is used, the color image data includes pixel-specific lightness (L), chroma (C), and hue angle (h) information. In other words, each pixel includes a respective lightness (L) value, a respective chroma (C) value, and a respective hue angle (h) value that characterizes the color appearance of the pixel. Similarly, when the L*a*b* color model is used, the color image data includes pixel-specific lightness (L), red/green (a), and blue/yellow (b) information, such that each pixel includes a respective lightness (L) value, a respective red/green (a) value, and a respective blue/yellow (b) value that characterizes the color appearance of the pixel.

The depicted embodiment of the methodology 300 performs a histogram generation task 308 to generate a characterizing histogram for the sample color image data. The characterizing histogram represents an appearance feature descriptor 208 of the coating sample to be matched. More specifically, the characterizing histogram is based on the color model properties 306. For the examples presented here, the characterizing histogram includes an integer number (N) of distinct histogram bins to obtain N corresponding bin counts. The number of histogram bins in the created histogram, the range of values associated with each histogram bin, and other parameters of the created histogram can be selected or configured to suit the needs and requirements of the particular application.

The pixel-specific color model properties 306 can be analyzed, categorized, arranged, transformed, or otherwise processed in an appropriate manner to obtain the values that are used to build the characterizing histogram. In accordance with some embodiments, the characterizing histogram is generated by arranging one or more of the pixel-specific color model properties (e.g., hue angle) into the histogram bins. In accordance with other embodiments, the characterizing histogram is generated from local binary patterns (which are created based on one or more of the pixel-specific color model properties, e.g., hue angle). Histograms based on hue angle and local binary patterns are described in more detail below. It should be appreciated that histograms based on other values, quantities, or parameters may also be generated and utilized by the methodology 300.

The illustrated embodiment of the methodology 300 performs a histogram vector creation task 310 to create a sample histogram vector for the sample color image data. The sample histogram vector represents an appearance feature descriptor 208 of the coating sample to be matched. The sample histogram vector is created from the characterizing histogram that results from task 308. For the example described here, the sample histogram vector is an N-dimensional vector that includes the N bin counts from the characterizing histogram. At least two variations of histogram vector creation are described in more detail below.

The methodology 300 can be executed in the manner described above to extract at least one appearance feature descriptor 208 (e.g., the sample histogram vector) for the coating sample to be matched. The at least one appearance feature descriptor 208 is processed by the comparison engine 210 in a suitable manner in an attempt to identify candidate coating specimens that closely match the coating sample. The comparison engine 210 may include or communicate with the coating specimen database 108, and apply predefined matching criteria 320 when searching for candidate coating specimens. To this end, the coating specimen database 108 includes appearance feature descriptors (e.g., characterizing histograms and/or corresponding histogram vectors) for a number of previously characterized coating specimens. The characterizing histograms and related histogram vectors are generated in accordance with the same routine described above, and are saved in the coating specimen database 108 for consideration by the comparison engine 210.

The comparison engine 210 is suitably configured and operated to identify one or more candidate coating specimens (preferably those that best match the color and appearance characteristics of the coating sample). Embodiments of the comparison engine 210 may utilize any of the following techniques and technology, individually or in any combination, without limitation: artificial intelligence; machine learning; supervised training; unsupervised training; or the like. Examples of suitable machine learning technologies include, but are not limited to: linear regression; decision tree; k-means clustering; principal component analysis (PCA); random decision forest; neural network; or any other type of machine learning algorithm known in the art.

The comparison engine 210 uses the predetermined matching criteria 320 when comparing the appearance feature descriptor 208 of the coating sample against appearance feature descriptors maintained in the coating specimen database 108 for previously characterized coating specimens. If the comparison engine 210 determines that the matching criteria 320 has been satisfied, then the retrieval logic 212 can retrieve the desired information that is linked to the matched candidate coating specimen(s). As mentioned above with reference to FIG. 2, the matched coating specimen data 324 may include any of the following, individually or in combination, without limitation: an identifier of the candidate coating specimen; descriptive data for the candidate coating specimen; color or appearance data for the candidate coating specimen; a production formulation associated with manufacturing or mixing of the candidate coating specimen; sample images of the candidate coating specimen as applied to a target surface. The matched coating specimen data 324 can be reviewed and considered by a technician (painter) to mix a corresponding coating composition for application to the intended target, e.g., a vehicle.

Figure 4:
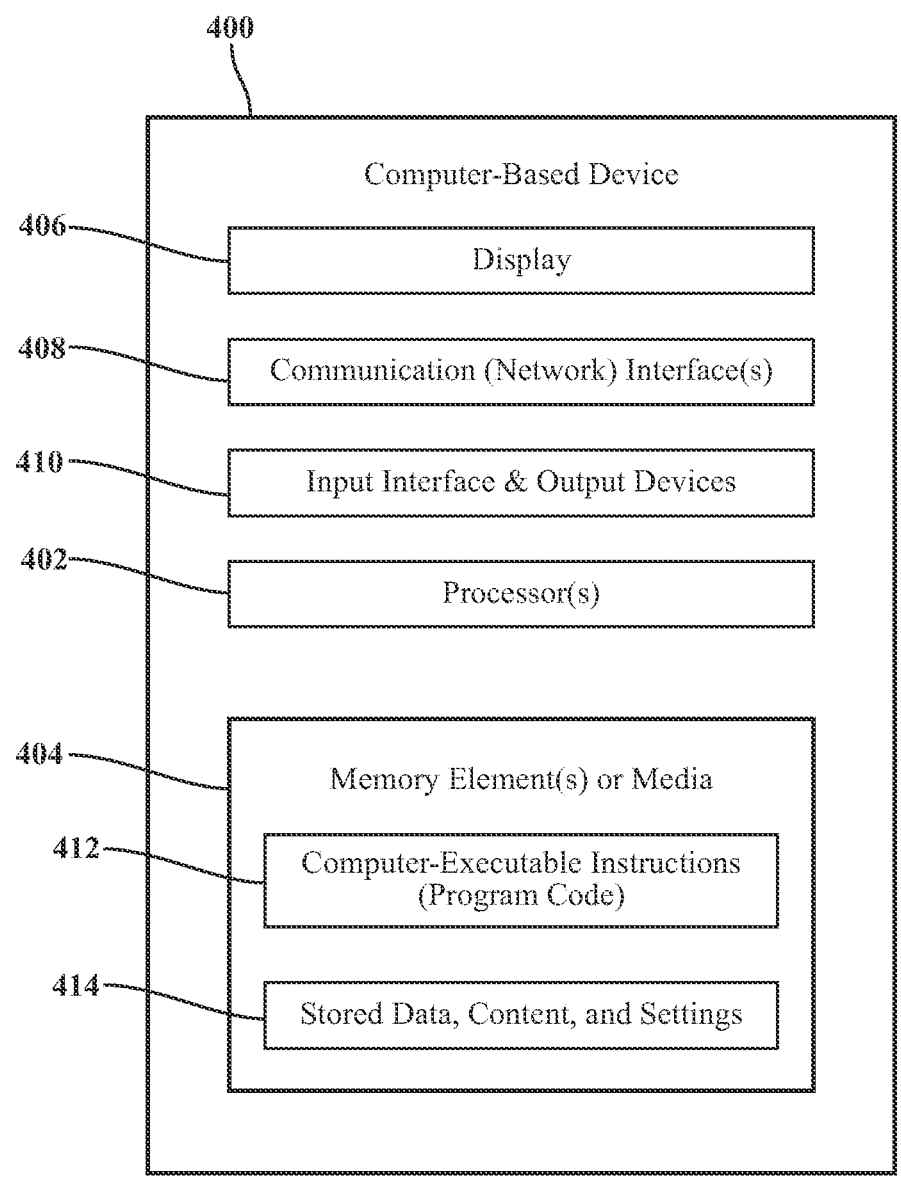
FIG. 4 is a block diagram of an exemplary embodiment of a computer-based device.

In accordance with certain embodiments, the system 100 depicted in FIG. 1 can be implemented using at least one computer-based or a processor-based device, system, or piece of equipment. Moreover, one or more items depicted in FIG. 2 and FIG. 3 can be implemented with or executed by at least one computer-based or a processor-based device, system, or piece of equipment. In this regard, FIG. 4 is a simplified block diagram representation of an exemplary embodiment of a computer-based device 400, which may be used to implement certain devices, systems, or components described here.

The device 400 generally includes, without limitation: at least one processor 402; at least one memory storage device, storage media, or memory element 404; a display 406; at least one communication (network) interface 408; and input and output (I/O) devices 410, such as an input interface, one or more output devices, one or more human/machine interface elements, or the like. In practice, the device 400 can include additional components, elements, and functionality that may be conventional in nature or unrelated to the particular application and methodologies described here.

A processor 402 may be, for example, a central processing unit (CPU), a field programmable gate array (FPGA), a microcontroller, an application specific integrated circuit (ASIC), or any other logic device or combination thereof. One or more memory elements 404 are communicatively coupled to the at least one processor 402, and can be implemented with any combination of volatile and non-volatile memory. The memory element 404 has non-transitory processor-readable and processor-executable instructions (program code) 412 stored thereon, wherein the instructions 412 are configurable to be executed by the at least one processor 402 as needed. When executed by the at least one processor 402, the instructions 412 cause the at least one processor 402 to perform the associated tasks, processes, and operations defined by the instructions 412. Of course, the memory element 404 may also include instructions associated with a file system of the host device 400 and instructions associated with other applications or programs. Moreover, the memory element 404 can serve as a data storage unit for the host device 400. For example, the memory element 404 can provide storage 414 for image data, color properties information, sensor data, measurements, settings or configuration data for the system, and the like.

The display 406 (if deployed with the particular embodiment of the device 400) may be integrated with the device 400 or communicatively coupled to the device 400 as a peripheral or accessory component. The shape, size, resolution, and technology of the display 406 will be appropriate to the particular implementation of the device 400. The display 406 can be realized as a monitor, touchscreen, or another conventional electronic display that is capable of graphically presenting data and/or information provided by the device 400.

The communication interface 408 represents the hardware, software, and processing logic that enables the device 400 to support data communication with other devices. In practice, the communication interface 408 can be suitably configured to support wireless and/or wired data communication protocols as appropriate to the particular embodiment. For example, the communication interface 408 can be designed to support a cellular communication protocol, a short-range wireless protocol (such as the BLUETOOTH communication protocol), and/or a WLAN protocol. As another example, if the device 400 is a desktop or laptop computer, then the communication interface can be designed to support the BLUETOOTH communication protocol, a WLAN protocol, and a LAN communication protocol (e.g., Ethernet).

The I/O devices 410 enable a user of the device 400 to interact with the device 400 as needed. In practice, the I/O devices 410 may include, without limitation: an input interface to receive data for handling by the device 400; a speaker, an audio transducer, or other audio feedback component; a haptic feedback device; a microphone; a mouse or other pointing device; a touchscreen or touchpad device; a keyboard; a joystick; a biometric sensor or reader (such as a fingerprint reader, a retina or iris scanner, a palm print or palm vein reader, etc.); a camera; a lidar sensor; or any conventional peripheral device. In this context, a touchscreen display 406 can be categorized as an I/O device 410. Moreover, a touchscreen display 406 may incorporate or be controlled to function as a fingerprint or palm print scanner. A haptic feedback device can be controlled to generate a variable amount of tactile or physical feedback, such as vibrations, a force, knock, or bump sensation, a detectable movement, or the like. Haptic feedback devices and related control schemes are well known and, therefore, will not be described in detail here.

Figure 5:
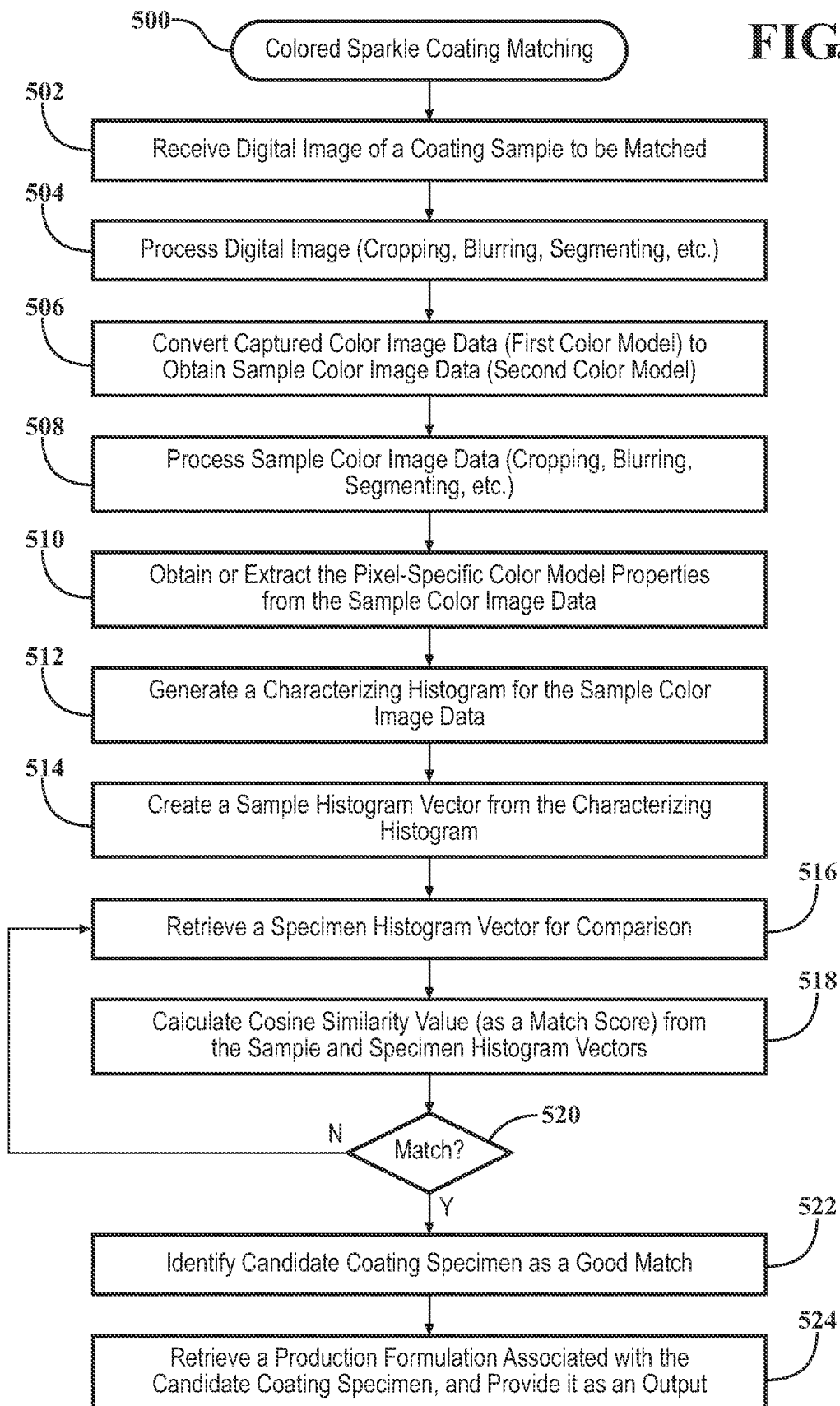
FIG. 5 is a flow chart that illustrates an exemplary embodiment of a method of matching color and appearance of coatings containing at least one effect pigment.
Figure 6:
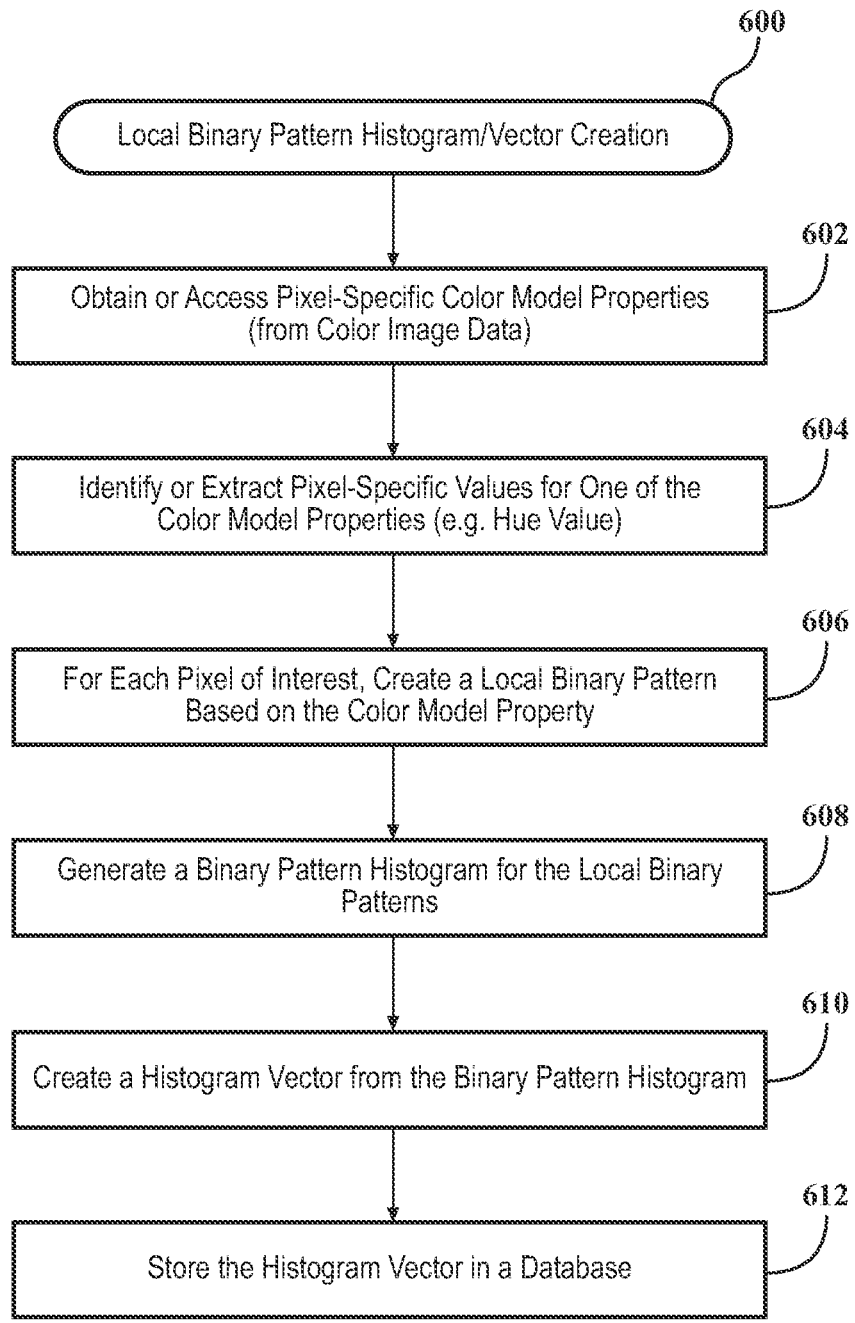
FIG. 6 is a flow chart that illustrates an exemplary embodiment of a method of generating a local binary pattern histogram and a corresponding histogram vector from pixel-specific color model properties associated with color image data.
Figure 8:
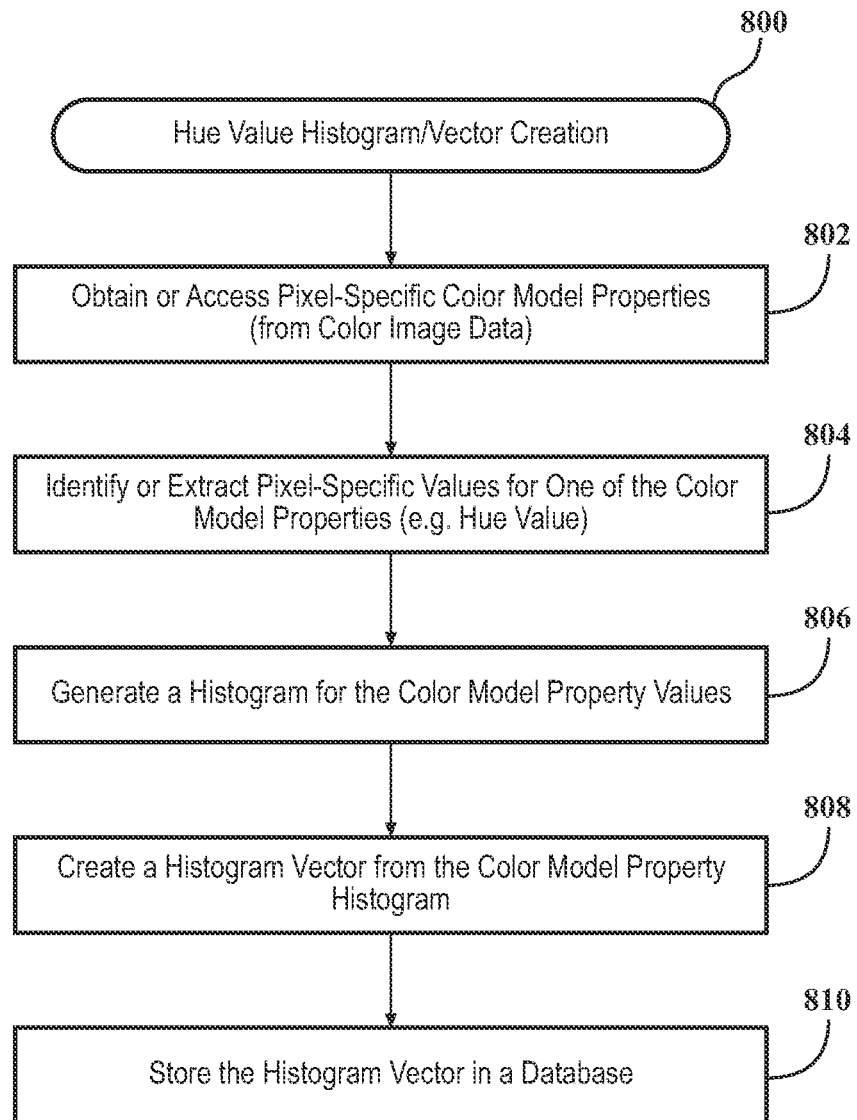
FIG. 8 is a flow chart that illustrates an exemplary embodiment of a method of generating a color model property histogram and a corresponding histogram vector from pixel-specific color model properties associated with color image data.

FIG. 5 is a flow chart that illustrates a process 500 that can be performed by a computing system of the type described here. The process 500 represents an exemplary embodiment of a method of matching color and appearance of coatings containing at least one effect pigment. FIG. 6 is a flow chart that illustrates a process 600 that can be performed by a computing system of the type described here. The process 600 represents an exemplary embodiment of a method of generating a local binary pattern histogram and a corresponding histogram vector from pixel-specific color model properties associated with color image data. FIG. 8 is a flow chart that illustrates a process 800 that can be performed by a computing system of the type described here. The process 800 represents an exemplary embodiment of a method of generating a color model property histogram and a corresponding histogram vector from pixel-specific color model properties associated with color image data. The various tasks performed in connection with a disclosed process may be performed by software, hardware, firmware, or any combination thereof. For illustrative purposes, the description of an illustrated process may refer to elements mentioned above in connection with FIGS. 1-4. It should be appreciated that an embodiment of an illustrated process may include any number of additional or alternative tasks, the tasks shown in the figures need not be performed in the illustrated order, and an illustrated process may be incorporated into a more comprehensive procedure or process having additional functionality not described in detail herein. Moreover, one or more of the tasks shown in a figure could be omitted from an embodiment of the illustrated process as long as the intended overall functionality remains intact.

Referring to FIG. 5, the process 500 can be performed when it's desirable to match the color/appearance of a colored sparkle coating sample (e.g., a coating that has already been applied to a surface of a vehicle) to one or more candidate colored sparkle coating specimens, such that a matching candidate coating specimen can be identified, mixed, and utilized. For example, a matching candidate can be fabricated for application to a repaired surface of a vehicle. The illustrated embodiment of the process 500 begins by receiving a digital image of a coating sample to be matched (task 502). As mentioned above, the digital image can be captured with any suitably configured digital image capture system. The original digital image is represented by captured color image data that is formatted in accordance with a first color model. In certain non-limiting embodiments, the first color model is an RGB color model, which may be a native format used by the digital image capture system.

If necessary or desirable, an optional task 504 can be performed to process the digital image in an appropriate manner. The image processing at task 504 can be performed to increase the efficiency and/or accuracy of the process 500, to remove unwanted visual artifacts, to concentrate on portions of the digital image that contain useful or important visual information, or the like. In this regard, task 504 may perform any of the following, without limitation: cropping; blurring; color conversion; scaling; or segmentation. In accordance with certain non-limiting embodiments, the process 500 performs segmentation on the captured color image data to identify sparkle pixels that exhibit visually distinguishable sparkle effects. Such segmentation can be desirable to ensure that the visibly detectable effects caused by any effect pigment(s) in the coating sample are analyzed and considered for purposes of color and appearance matching.

Whether or not the captured color image data (of the captured digital image) has been pre-processed at task 504, the process 500 continues by converting the captured color image data into a different form (task 506). The converted form is referred to herein as the "sample color image data" to distinguish it from the captured color image data. The conversion at task 506 converts the captured color image data (which is formatted in accordance with the first color model) to obtain the sample color image data (which is formatted in accordance with a second color model that is different than the first color model, with or without accounting for scene, photometric, or spectroradiometric information). Notably, the second color model specifies or includes a plurality of pixel-specific color model properties having values that define the color characteristics of the pixels. In certain non-limiting embodiments, the second color model includes pixel-specific hue values as one of its color model properties. For example, task 506 may convert captured RGB image data into corresponding L*C*h image data as defined by an L*C*h color model, which includes a hue angle value (within the range of 0 degrees to 360 degrees, inclusive) for each pixel. As described in more detail below, hue information can be used as a basis for generating an appearance feature descriptor for coatings. Although hue information is utilized in certain exemplary embodiments, other color model properties can be utilized in lieu of or in addition to hue information. In this regard, the process 500 may consider any of these color model properties, individually or in combination, and without limitation: pixel-specific lightness values; pixel-specific chroma values; pixel-specific hue values; pixel-specific colorfulness; pixel-specific brightness; pixel-specific saturation.

If necessary or desirable, an optional task 508 can be performed to process the converted image data in an appropriate manner. Task 508 may be performed whether or not the optional task 504 is performed. The image processing at task 508 can be performed to increase the efficiency and/or accuracy of the process 500, to remove unwanted visual artifacts, to concentrate on portions of the digital image that contain useful or important visual information, or the like. In this regard, task 508 may perform any of the following, without limitation: cropping; blurring; color conversion; scaling; or segmentation. In accordance with certain non-limiting embodiments, the process 500 performs segmentation on the converted image data to identify sparkle pixels that exhibit visually distinguishable sparkle effects. Such segmentation can be desirable to ensure that the visibly detectable effects caused by any effect pigment(s) in the coating sample are analyzed and considered for purposes of color and appearance matching.

The process 500 may continue by obtaining, identifying, or extracting the pixel-specific color model properties from the sample color image data (task 510). More specifically, task 510 obtains, identifies, or extracts at least one pixel-specific color model property for purposes of generating the corresponding appearance feature descriptor for the coating sample to be matched. For the exemplary embodiment described here, task 510 obtains, identifies, or extracts one or more of the available color model properties, e.g., only the hue values. The process 500 continues by generating a characterizing histogram for the sample color image data (task 512). More specifically, the characterizing histogram is generated from the pixel-specific color model property (or properties) designated at task 510. The characterizing histogram includes an integer number (N) of distinct bins that are used to obtain N corresponding bin counts. A quantity, value, score, parameter, pattern, or string calculated for each pixel of interest is placed into one of the histogram bins. Accordingly, if 500 pixels are under consideration, then 500 entries will be distributed across the N bin counts. The characterizing histogram can be visualized in two dimensions with the bins arranged horizontally (along the X axis) and the number of bin counts arranged vertically (along the Y axis). In this way, the characterizing histogram represents an appearance feature descriptor of the coating sample to be matched.

In accordance with certain implementations: the pixel-specific color model properties include pixel-specific hue values; local binary patterns are created based on the pixel-specific hue values; the characterizing histogram is a binary pattern histogram for the local binary patterns; and the binary pattern histogram arranges the local binary patterns into the N distinct bins to obtain the N bin counts. In accordance with certain implementations: the pixel-specific color model properties include pixel-specific lightness values; local binary patterns are created based on the pixel-specific lightness values; the characterizing histogram is a binary pattern histogram for the local binary patterns; and the binary pattern histogram arranges the local binary patterns into the N distinct bins to obtain the N bin counts. In accordance with certain implementations: the pixel-specific color model properties include pixel-specific chroma values; local binary patterns are created based on the pixel-specific chroma values; the characterizing histogram is a binary pattern histogram for the local binary patterns; and the binary pattern histogram arranges the local binary patterns into the N distinct bins to obtain the N bin counts. An example of a characterizing histogram based on local binary patterns is described below with reference to FIG. 6.

In accordance with certain implementations: the pixel-specific color model properties include pixel-specific hue values; the characterizing histogram is a hue histogram for the pixel-specific hue values; and the hue histogram arranges the pixel-specific hue values into the N distinct bins to obtain the N bin counts. In accordance with certain implementations: the pixel-specific color model properties include pixel-specific lightness values; the characterizing histogram is a lightness histogram for the pixel-specific lightness values; and the lightness histogram arranges the pixel-specific lightness values into the N distinct bins to obtain the N bin counts. In accordance with certain implementations: the pixel-specific color model properties include pixel-specific chroma values; the characterizing histogram is a chroma histogram for the pixel-specific chroma values; and the chroma histogram arranges the pixel-specific chroma values into the N distinct bins to obtain the N bin counts. An example of a characterizing histogram based on hue values is described below with reference to FIG. 8.

The process 500 may continue by creating a sample histogram vector from the characterizing histogram (task 514). The sample histogram vector will be an N-dimensional vector that includes the N bin counts as components of the vector. In this regard, a histogram vector can be expressed in the following manner: $\vec{x} = [x_0, x_1, \ldots, x_{N-1}]$, where the values of x correspond to the different bin counts. The sample histogram vector may be considered to be an alternate expression of the characterizing histogram. Accordingly, the sample histogram vector represents an appearance feature descriptor of the coating sample to be matched.

The process 500 uses the sample histogram vector to search for candidate coating specimens that closely resemble (in color and appearance) the coating sample that is to be matched. To this end, the process 500 retrieves a specimen histogram vector for comparison against the sample histogram vector (task 516). As mentioned above with reference to FIGS. 1-3, the specimen histogram vector can be retrieved from the coating specimen database 108, which is populated, maintained, and operated to store characterizing data (including specimen histogram vectors) for a number of previously characterized coating specimens. In this regard, the retrieved specimen histogram vector has similar traits and properties as the sample histogram vector—the specimen histogram vector is an N-dimensional vector derived from pixel-specific color model properties obtained for a particular candidate coating specimen in response to a captured digital image of that candidate coating specimen. For compatibility and consistency, the specimen histogram vector is created from the same color model property (or properties) that are used to create the sample histogram vector (e.g., hue angle values, lightness values, or chroma values).

The process 500 compares the sample histogram vector against the specimen histogram vector by calculating a cosine similarity value from the sample and specimen histogram vectors (task 518). The cosine similarity value is calculated as a measure of an angle between the sample and specimen histogram vectors. In accordance with the exemplary embodiments described here, the cosine similarity value indicates how well the candidate coating specimen matches the coating sample to be matched, in color and appearance. In particular, the cosine similarity value is calculated in accordance with the expression $$\cos(\theta) = \frac{\vec{x}^A \cdot \vec{x}^B}{|\vec{x}^A||\vec{x}^B|},$$

where $\vec{x}^A$ is the sample histogram vector, $\vec{x}^B$ is the specimen histogram vector, the numerator is a vector dot product, and the denominator represents multiplication of the norms of the two vectors. Thus, cosine similarity values that approach 1.0 indicate good matches, and cosine similarity values that approach 0.0 indicate very poor matches. The cosine similarity value represents a calculated match score for the candidate coating specimen relative to the coating sample to be matched.

Although the exemplary embodiment presented here employs the cosine similarity value as an indication of matching accuracy, the process 500 may use alternative or additional comparison metrics if so desired. For example, the process 500 may compare the sample histogram vector against the specimen histogram vector by calculating a distance metric (e.g., a geometric distance) from the sample histogram vector and the specimen histogram vector, wherein the calculated distance metric indicates how well the candidate coating specimen matches the coating sample to be matched. In certain embodiments, the calculated distance represents the absolute distance between the histogram vectors. For example, the process 500 may calculate the Euclidean distance between the histogram vectors: d=| $\vec{x}^A - \vec{x}^B$|, where $\vec{x}^A$ is the sample histogram vector, $\vec{x}^B$ is the specimen histogram vector, and dis the calculated distance.

As described above with reference to FIG. 3, the process 500 can utilize appropriate matching criteria 320 to declare whether or not the sample histogram vector closely matches the specimen histogram vector for the candidate coating specimen. Accordingly, the process 500 checks for a potential match by applying the predetermined matching criteria to the calculated cosine similarity value (query task 520). As a non-limiting example, the matching criteria may define a threshold of 0.9, such that cosine similarity values below 0.9 are not considered, while cosine similarity values at or above 0.9 are treated as good matches. As another non-limiting example, the matching criteria can specify multiple thresholds that define poor matches, marginal matches, and good matches.

If the matching criteria is not satisfied (the "No" branch of query task 520, which indicates that the candidate coating specimen does not closely match the sample coating), then the process 500 may return to task 516 to retrieve another specimen histogram vector for comparison. If the matching criteria is satisfied (the "Yes" branch of query task 520, which indicates that the candidate coating specimen closely matches the sample coating), then the process 500 may identify the candidate coating specimen as a good match (task 522) and retrieve relevant information or data related to that candidate coating specimen. For example, the process 500 may retrieve a production formulation or "recipe" associated with the candidate coating specimen (task 524) and provide the retrieved information as an output for consideration by a user, a technician, or an operator of a coating application system. In certain embodiments, the retrieved information (production formulation) can be provided to a mixing or fabrication system or station that mixes a coating according to the retrieved formulation.

Although not separately depicted in FIG. 5, the process 500 may return to task 516 after identifying a matching coating specimen. Indeed, the comparison routine can be repeated any number of times until a desired number of candidate coating specimens are identified as being potential matches. A user can then be presented with different options, sample images of the candidate coating specimens, and/or other information that enables the user to make an informed decision regarding which (if any) candidate coating specimen to consider.

The process 500 described above can be modified as desired to accommodate use of different histograms (which are derived from different color model properties and/or color image data). The process 600 illustrated in FIG. 6 generates a histogram and a corresponding histogram vector based on local binary patterns. Accordingly, matching of a coating sample can be based on histogram vectors that are based on local binary patterns, wherein a suitable comparison metric (e.g., a cosine similarity value, a distance metric, or the like) is calculated for the histogram vectors as a measure of how well the coating sample matches a particular coating specimen. An embodiment of the process 600 can be integrated with the process 500 or otherwise performed in association with the process 500. The process 600 can be used to generate a histogram and/or a histogram vector on demand for the coating sample to be matched. The process 600 can also be used to generate histograms and/or histogram vectors for any number of coating specimens, such that the coating specimen database 108 can be populated with coating specimen data ahead of time.

This description assumes that appropriate color image data of the coating is already available for processing and analysis, and that the color image data has already been filtered, pre-processed, or conditioned (if necessary or desired) as mentioned above with reference to tasks 504 and 508 of the process 500. For example, the color image data may have been subjected to segmentation to identify sparkle pixels that exhibit visually distinguishable sparkle effects, such that the resulting characterizing histogram and associated histogram vector are based on the identified sparkle pixels and possibly some surrounding non-sparkle pixels. As described above, the color image data is formatted in accordance with a suitable color model that characterizes pixels using certain pixel-specific color model properties. Accordingly, the process 600 obtains or access the pixel-specific color model properties from the color image data (task 602) and obtains, identifies, or extracts the pixel-specific values for one of the available color model properties (task 604), e.g., hue values, lightness values, chroma values, or the like.

Figure 7:
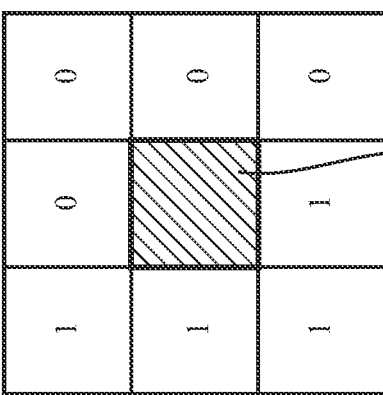
FIG. 7 is a diagram that illustrates an exemplary technique for creating a local binary pattern based on a pixel-specific color model property.
Figure 7:
Figure 7:
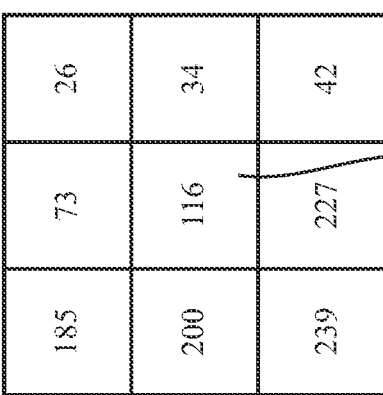
Figure 7:
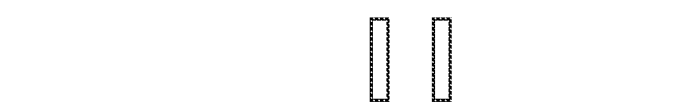
Figure 7:
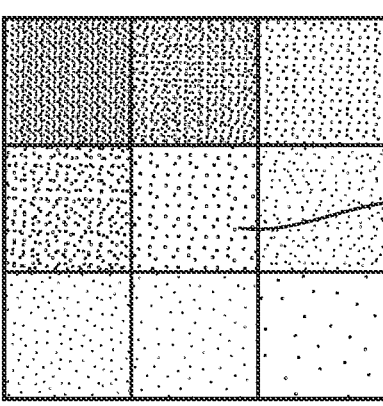

The process 600 may continue by creating a local binary pattern for each pixel of interest (task 606). Each local binary pattern is created based on pixel-specific color model property values of the pixel of interest and at least some of its neighboring pixels. In accordance with certain embodiments, each local binary pattern is derived from values of one color model property, e.g., hue angles. In this regard, FIG. 7 is a diagram that illustrates an exemplary technique for creating a local binary pattern based on one pixel-specific color model property, namely, hue angle. It should be appreciated that local binary patterns can be derived from additional or alternative color model properties if so desired. Moreover, the specific color model values and resulting binary pattern shown in FIG. 7 are provided as merely one example that demonstrates the technique.

In FIG. 7, the first group 702 represents a pixel of interest 704 and its eight nearest neighbors. The different shading/color variations depicted in the first group 702 correspond to the different colors and appearance of the nine pixels. The second group 708 in FIG. 7 includes the hue angle values (between 0 degrees and 360 degrees, inclusive) for the nine pixels. Thus, the pixel of interest 704 has a hue angle value of 116 for this particular example, and the remaining hue angle values appear with their respective pixels. The third group 712 in FIG. 7 includes binary values (0 or 1) assigned to each of the eight nearest neighbor pixels. The pixel of interest 704 does not have a binary value assigned to it, because the pixel of interest 704 is the basis for the comparison that produces the binary values for the eight nearest neighbor pixels. The process 600 can employ any suitable binary comparison algorithm or formula to obtain the binary values. The non-limiting example depicted in FIG. 7 uses a simple numerical comparison, relative to the hue angle value of the pixel of interest 704. To this end, if the hue angle value of a neighboring pixel is outside a range (e.g., a range of five degrees) from the hue angle of the pixel of interest 704, then a zero bit is assigned to that neighboring pixel. Conversely, if the hue angle value of a neighboring pixel is within the range (e.g., a range of five degrees) from the hue angle of the pixel of interest 704, then a one bit is assigned to that neighboring pixel. If the hue angle values are identical, then either a zero or a one can be assigned to the neighboring pixel by default (or a bit value can be randomly assigned).

The third group 712 contains eight binary values that can be used to generate a corresponding local binary pattern for the pixel of interest 704. Although not always required, the implementation described here creates the local binary pattern from all of the eight binary values. The local binary pattern can be created using any methodology that is repeatable across all of the pixels of interest in the image. For the non-limiting example described here, the local binary pattern is created from a clockwise sequence of bits starting from the top left corner of the third group 712. Accordingly, the local binary pattern for the illustrated example is 10000111, which can be expressed as the decimal number 135. A different local binary pattern (and a different decimal equivalent) will result if the eight bits are arranged in a different order.

FIG. 7 illustrates a straightforward example where the local binary pattern is created from the eight nearest neighbors of the pixel of interest 704. In other implementations, the local binary pattern can be created from less than eight of the nearest neighbor pixels. In other implementations, the local binary pattern can be created using one or more additional surrounding pixels (that are more than one pixel away from the pixel of interest 704, e.g., second-nearest neighbors and beyond). These and other methodologies for creating the local binary patterns can be leveraged by the process 600.

Referring again to FIG. 6, task 606 results in a collection of local binary patterns (one for each pixel under analysis). The process 600 continues by generating a binary pattern histogram for the local binary patterns (task 608). As mentioned above with reference to FIG. 5 and the process 500, the binary pattern histogram includes an integer number (N) of distinct bins that are used to obtain the same number of bin counts. Accordingly, the binary pattern histogram arranges the local binary patterns into its bins to obtain the bin counts. In certain embodiments, at least one of the binary pattern histogram bins is established and maintained to group local binary patterns that are associated with similar color and appearance characteristics. For example, the local binary pattern of 01010101 may be grouped into the same bin as the local binary pattern of 10101010 (due to the similar pattern of alternating bits). As another example, the local binary pattern of 11101110 (all ones above and below the pixel of interest) may be grouped into the same bin as the local binary pattern of 10111011 (all ones to the left and right of the pixel of interest). The specific methodology for grouping, classifying, or binning the local binary patterns may vary from one embodiment to another, as appropriate for the particular application, system implementation, or use case.

The process 600 may continue by creating a histogram vector from the binary pattern histogram (task 610). As explained above for the process 500, the histogram vector will be an N-dimensional vector that includes the N bin counts as components of the vector. The histogram vector is usable for comparing color and appearance of the coating against color and appearance of at least one other coating. In certain situations, the process 600 is used to characterize a coating specimen to be used as a reference for comparison against a coating sample. Accordingly, the process 600 can store the coating histogram vector in a suitably configured and formatted database (task 612), which may be associated with one or more computing systems.

The process 800 illustrated in FIG. 8 generates a histogram and a corresponding histogram vector based on pixel-specific color model properties associated with the color image data. An embodiment of the process 800 can be integrated with the process 500 or otherwise performed in association with the process 500. The process 800 can be used to generate a histogram and/or a histogram vector on demand for the coating sample to be matched. The process 800 can also be used to generate histograms and/or histogram vectors for any number of coating specimens, such that the coating specimen database 108 can be populated with coating specimen data ahead of time.

This description assumes that appropriate color image data of the coating is already available for processing and analysis, and that the color image data has already been filtered, pre-processed, or conditioned (if necessary or desired) as mentioned above with reference to tasks 504 and 508 of the process 500. For example, the color image data may have been subjected to segmentation to identify sparkle pixels that exhibit visually distinguishable sparkle effects, such that the resulting characterizing histogram and associated histogram vector are based on the identified sparkle pixels and possibly some surrounding non-sparkle pixels. As described above, the color image data is formatted in accordance with a suitable color model that characterizes pixels using certain pixel-specific color model properties. Accordingly, the process 800 obtains or access the pixel-specific color model properties from the color image data (task 802) and obtains, identifies, or extracts the pixel-specific values for one of the available color model properties (task 804), e.g., hue values, lightness values, chroma values, or the like. The following description assumes that hue angle values are used.

The process 800 continues by generating a histogram for the color model property values (task 806), e.g., the hue angle values. As mentioned above with reference to FIG. 5 and the process 500, the hue histogram includes N distinct bins that are used to obtain N bin counts. Accordingly, the hue histogram arranges the hue angle values into the bins to obtain the bin counts. The specific methodology for grouping, classifying, or binning the color model property values may vary from one embodiment to another, as appropriate for the particular application, system implementation, or use case.

The process 800 may continue by creating a histogram vector from the histogram (task 808). As explained above for the process 500, the histogram vector will be an N-dimensional vector that includes the N bin counts as components of the vector. The histogram vector is usable for comparing color and appearance of the coating against color and appearance of at least one other coating. In certain situations, the process 800 is used to characterize a coating specimen to be used as a reference for comparison against a coating sample. Accordingly, the process 800 can store the coating histogram vector in a suitably configured and formatted database (task 810), which may be associated with one or more computing systems.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of matching color and appearance of coatings containing at least one effect pigment, the method comprising:
obtaining, for a coating sample to be matched, sample color image data comprising pixel-specific color model properties, wherein the sample color image data is based on a digital image of the coating sample to be matched, as captured by a digital image capture system;
generating a characterizing histogram for the sample color image data, the characterizing histogram comprising N distinct bins to obtain N bin counts, wherein the characterizing histogram represents an appearance feature descriptor of the coating sample to be matched;
creating a sample histogram vector from the characterizing histogram, wherein the sample histogram vector is an N-dimensional vector comprising the N bin counts;
retrieving a specimen histogram vector for comparison against the sample histogram vector, wherein the specimen histogram vector is an N-dimensional vector derived from pixel-specific color model properties obtained for a candidate coating specimen in response to a captured digital image of the candidate coating specimen;
calculating a cosine similarity value from the sample histogram vector and the specimen histogram vector as a measure of an angle between the sample histogram vector and the specimen histogram vector, wherein the cosine similarity value indicates how well the candidate coating specimen matches the coating sample to be matched,
wherein the pixel-specific color model properties include pixel-specific hue values, lightness values, or chroma values; and
creating local binary patterns based on the pixel-specific hue values, lightness values, or chroma values respectively,
wherein the characterizing histogram is a binary pattern histogram for the local binary patterns, and
wherein the binary pattern histogram arranges the local binary patterns into the N distinct bins to obtain the N bin counts.

2. The method of claim 1, wherein:
the pixel-specific color model properties include pixel-specific hue values;
the characterizing histogram is a hue histogram for the pixel-specific hue values; and
the hue histogram arranges the pixel-specific hue values into the N distinct bins to obtain the N bin counts.

3. The method of claim 1, wherein:
the pixel-specific color model properties include pixel-specific lightness values;
the characterizing histogram is a lightness histogram for the pixel-specific lightness values; and
the lightness histogram arranges the pixel-specific lightness values into the N distinct bins to obtain the N bin counts.

4. The method of claim 1, wherein:
the pixel-specific color model properties include pixel-specific chroma values;
the characterizing histogram is a chroma histogram for the pixel-specific chroma values; and
the chroma histogram arranges the pixel-specific chroma values into the N distinct bins to obtain the N bin counts.

5. The method of claim 1, further comprising:
retrieving a production formulation associated with the candidate coating specimen, when the calculated cosine similarity value satisfies predetermined matching criteria.

6. The method of claim 1, further comprising:
receiving the digital image captured by the digital image capture system, the digital image represented by captured color image data that is formatted in accordance with a first color model; and
converting the captured color image data into the sample color image data, wherein the sample color image data is formatted in accordance with a second color model that includes the color model properties.

7. The method of claim 6, wherein:
the first color model is an RGB color model; and
the second color model includes pixel-specific hue values as one of the color model properties.

8. The method of claim 7, wherein the pixel-specific hue values are hue angles within the range of 0 degrees to 360 degrees, inclusive.

9. The method of claim 1, further comprising:
segmenting the sample color image data to identify sparkle pixels that exhibit visually distinguishable sparkle effects, wherein the generating step generates the characterizing histogram for the identified sparkle pixels.

10. The method of claim 1, wherein the cosine similarity value is calculated in accordance with the expression $$\cos(\theta) = \frac{\vec{x}^A \cdot \vec{x}^B}{|\vec{x}^A||\vec{x}^B|},$$

where $\vec{x}^A$ is the sample histogram vector and $\vec{x}^B$ is the specimen histogram vector.

11. At least one non-transitory machine-readable storage medium that stores instructions executable by at least one processor, the instructions configurable to cause the at least one processor to perform a method of matching color and appearance of coatings containing at least one effect pigment, the method comprising:
obtaining, for a coating sample to be matched, sample color image data comprising pixel-specific color model properties, wherein the sample color image data is based on a digital image of the coating sample to be matched, as captured by a digital image capture system;
generating a characterizing histogram for the sample color image data, the characterizing histogram comprising N distinct bins to obtain N bin counts, wherein the characterizing histogram represents an appearance feature descriptor of the coating sample to be matched;
creating a sample histogram vector from the characterizing histogram, wherein the sample histogram vector is an N-dimensional vector comprising the N bin counts;
retrieving a specimen histogram vector for comparison against the sample histogram vector, wherein the specimen histogram vector is an N-dimensional vector derived from pixel-specific color model properties obtained for a candidate coating specimen in response to a captured digital image of the candidate coating specimen;

calculating a cosine similarity value from the sample histogram vector and the specimen histogram vector as a measure of an angle between the sample histogram vector and the specimen histogram vector, wherein the cosine similarity value indicates how well the candidate coating specimen matches the coating sample to be matched, wherein the pixel-specific color model properties include pixel-specific hue values, lightness values, or chroma values; and creating local binary patterns based on the pixel-specific hue values, lightness values, or chroma values respectively, wherein the characterizing histogram is a binary pattern histogram for the local binary patterns, and wherein the binary pattern histogram arranges the local binary patterns into the N distinct bins to obtain the N bin counts.

12. The at least one non-transitory machine-readable storage medium of claim 11, wherein:

the characterizing histogram is generated from pixel-specific property values for one or more of the color model properties; and the characterizing histogram arranges the pixel-specific property values into the N distinct bins to obtain the N bin counts.

13. The at least one non-transitory machine-readable storage medium of claim 11, wherein:

the method performed by the at least one processor further comprises the step of creating local binary patterns based on pixel-specific property values for one or more of the color model properties;

the characterizing histogram is a binary pattern histogram for the local binary patterns; and the binary pattern histogram arranges the local binary patterns into the N distinct bins to obtain the N bin counts.

14. The at least one non-transitory machine-readable storage medium of claim 11, wherein the method performed by the at least one processor further comprises:

retrieving a production formulation associated with the candidate coating specimen, when the calculated cosine similarity value satisfies predetermined matching criteria.

15. A computing system operable to match color and appearance of coatings containing at least one effect pigment, the computing system comprising:

at least one processor; and at least one non-transitory machine-readable storage medium that stores instructions executable by the at least one processor, the instructions configurable to cause the at least one processor to perform a method comprising the steps of:

obtaining, for a coating sample to be matched, sample color image data comprising pixel-specific color model properties, wherein the sample color image data is based on a digital image of the coating sample to be matched, as captured by a digital image capture system;

generating a characterizing histogram for the sample color image data, the characterizing histogram comprising N distinct bins to obtain N bin counts, wherein the characterizing histogram represents an appearance feature descriptor of the coating sample to be matched;

creating a sample histogram vector from the characterizing histogram, wherein the sample histogram vector is an N-dimensional vector comprising the N bin counts;

retrieving a specimen histogram vector for comparison against the sample histogram vector, wherein the specimen histogram vector is an N-dimensional vector derived from pixel-specific color model properties obtained for a candidate coating specimen in response to a captured digital image of the candidate coating specimen;

calculating a cosine similarity value from the sample histogram vector and the specimen histogram vector as a measure of an angle between the sample histogram vector and the specimen histogram vector, wherein the cosine similarity value indicates how well the candidate coating specimen matches the coating sample to be matched, wherein the pixel-specific color model properties include pixel-specific hue values, lightness values, or chroma values; and creating local binary patterns based on the pixel-specific hue values lightness values, or chroma values respectively, wherein the characterizing histogram is a binary pattern histogram for the local binary patterns, and wherein the binary pattern histogram arranges the local binary patterns into the N distinct bins to obtain the N bin counts.

16. The computing system of claim 15, wherein:

the characterizing histogram is generated from pixel-specific property values for one or more of the color model properties; and the characterizing histogram arranges the pixel-specific property values into the N distinct bins to obtain the N bin counts.

17. The computing system of claim 15, wherein:

the method performed by the at least one processor further comprises the step of creating local binary patterns based on pixel-specific property values for one or more of the color model properties;

the characterizing histogram is a binary pattern histogram for the local binary patterns; and the binary pattern histogram arranges the local binary patterns into the N distinct bins to obtain the N bin counts.

18. The computing system of claim 15, wherein the method performed by the at least one processor further comprises:

retrieving a production formulation associated with the candidate coating specimen, when the calculated cosine similarity value satisfies predetermined matching criteria.

19. A method of matching color and appearance of coatings containing at least one effect pigment, the method comprising:

obtaining, for a coating sample to be matched, sample color image data comprising pixel-specific hue values, wherein the sample color image data is based on a digital image of the coating sample to be matched, as captured by a digital image capture system;

generating a hue histogram for the pixel-specific hue values, wherein the hue histogram arranges the pixel-specific hue values into N distinct hue value bins to obtain N bin counts, and wherein the hue histogram represents an appearance feature descriptor of the coating sample to be matched;

creating a sample histogram vector from the hue histogram, wherein the sample histogram vector is an N-dimensional vector comprising the N bin counts;

retrieving a specimen histogram vector for comparison against the sample histogram vector, wherein the specimen histogram vector is an N-dimensional vector derived from pixel-specific hue values obtained for a candidate coating specimen in response to a captured digital image of the candidate coating specimen;

calculating a cosine similarity value from the sample histogram vector and the specimen histogram vector as a measure of an angle between the sample histogram vector and the specimen histogram vector, wherein the cosine similarity value indicates how well the candidate coating specimen matches the coating sample to be matched, wherein the pixel-specific color model properties include pixel-specific hue values, lightness values, or chroma values; and creating local binary patterns based on the pixel-specific hue values, lightness values, or chroma values respectively, wherein the characterizing histogram is a binary pattern histogram for the local binary patterns, and wherein the binary pattern histogram arranges the local binary patterns into the N distinct bins to obtain the N bin counts.

20. The method of claim 19, further comprising:

retrieving a production formulation associated with the candidate coating specimen, when the calculated cosine similarity value satisfies predetermined matching criteria.

21. The method of claim 19, further comprising:

receiving the digital image captured by the digital image capture system, the digital image represented by captured color image data that is formatted in accordance with a first color model; and converting the captured color image data into the sample color image data, wherein the sample color image data is formatted in accordance with a second color model that specifies pixel-specific hue values as a color model property.

22. The method of claim 21, wherein:

the first color model is an RGB color model;

the second color model is an L*C*h color model; and the pixel-specific hue values are hue angles within the range of 0 degrees to 360 degrees, inclusive.

* * * * *